(12) United States Patent
Hwang et al.

(10) Patent No.: US 6,717,295 B2
(45) Date of Patent: Apr. 6, 2004

(54) COOLING APPARATUS FOR LINEAR MOTOR

(75) Inventors: Ji Hyun Hwang, Kyungki-do (KR); Do Hyun Kim, Kyoungki-do (KR); Joon Seok Song, Kyoungki-do (KR)

(73) Assignee: Mirae Corporation, Chunan-si (KR)

( * ) Notice: Subject to any disclaimer, the term of this patent is extended or adjusted under 35 U.S.C. 154(b) by 117 days.

(21) Appl. No.: 10/195,449

(22) Filed: Jul. 16, 2002

(65) Prior Publication Data

US 2003/0160524 A1 Aug. 28, 2003

(30) Foreign Application Priority Data

Feb. 22, 2002 (KR) ............................................. 2002-9622

(51) Int. Cl.$^7$ ................................................ H02K 9/00
(52) U.S. Cl. ............................. 310/12; 310/16; 310/58
(58) Field of Search ............................... 310/12, 16, 58

(56) References Cited

U.S. PATENT DOCUMENTS 5,783,877 A * 7/1998 Chitayat ....................... 310/12

* cited by examiner

Primary Examiner—Karl Tamai
Assistant Examiner—Iraj A. Mohandesi
(74) Attorney, Agent, or Firm—Fleshner & Kim, LLP

(57) ABSTRACT

The present invention discloses a cooling apparatus for a linear motor comprising: a 'U' shaped stator back iron; a stator having a plurality of permanent magnets installed on inner facing surfaces of the stator back iron; a coil unit positioned between the stator and the permanent magnets with a predetermined gap; a movable unit having a movable unit back iron fixed on the coil unit, the movable back iron having at least one first air hole formed therein in a longitudinal direction and a first air nozzle linked to the first air hole for injecting cooling air from the top portion of the coil unit to the bottom portion; and a frame aligned at the lower portion of the coil unit having a second air hole formed in a longitudinal direction thereof for receiving the cooling air and a second air nozzle linked to the second air hole for injecting the cooling air from the bottom portion of the coil unit to the top portion.

21 Claims, 11 Drawing Sheets

No air injection

FIG. 7b

Air injection to movable unit

FIG. 7c

Air injection to stator and movable unit

COOLING APPARATUS FOR LINEAR MOTOR

BACKGROUND OF THE INVENTION

1. Field of the Invention

The present invention relates to a cooling apparatus for a linear motor, and in particular to an improved cooling apparatus for a linear motor which can uniformly cool the whole portions of the linear motor.

2. Description of the Background Art

Differently from a general motor for performing rotary motion, a movable coil type linear motor moves directly on a straight line, and thus gets into the spotlight as a next generation motor having a high operational speed and enabling a precise positioning control.

In the movable coil type linear motor, a movable unit performs linear motion due to thrust generated between a coil unit and a permanent magnet. According to a number and position of the permanent magnets, the movable coil type linear motor is classified into an one-sided linear motor and both-sided linear motor. That is, the movable coil type linear motor is classified into the one-sided linear motor and both-sided linear motor according to whether the permanent magnets which are stators are installed at one side or both sides of the coil unit.

The linear motor relates to the both-sided type, which will now be explained.

Figure 1:
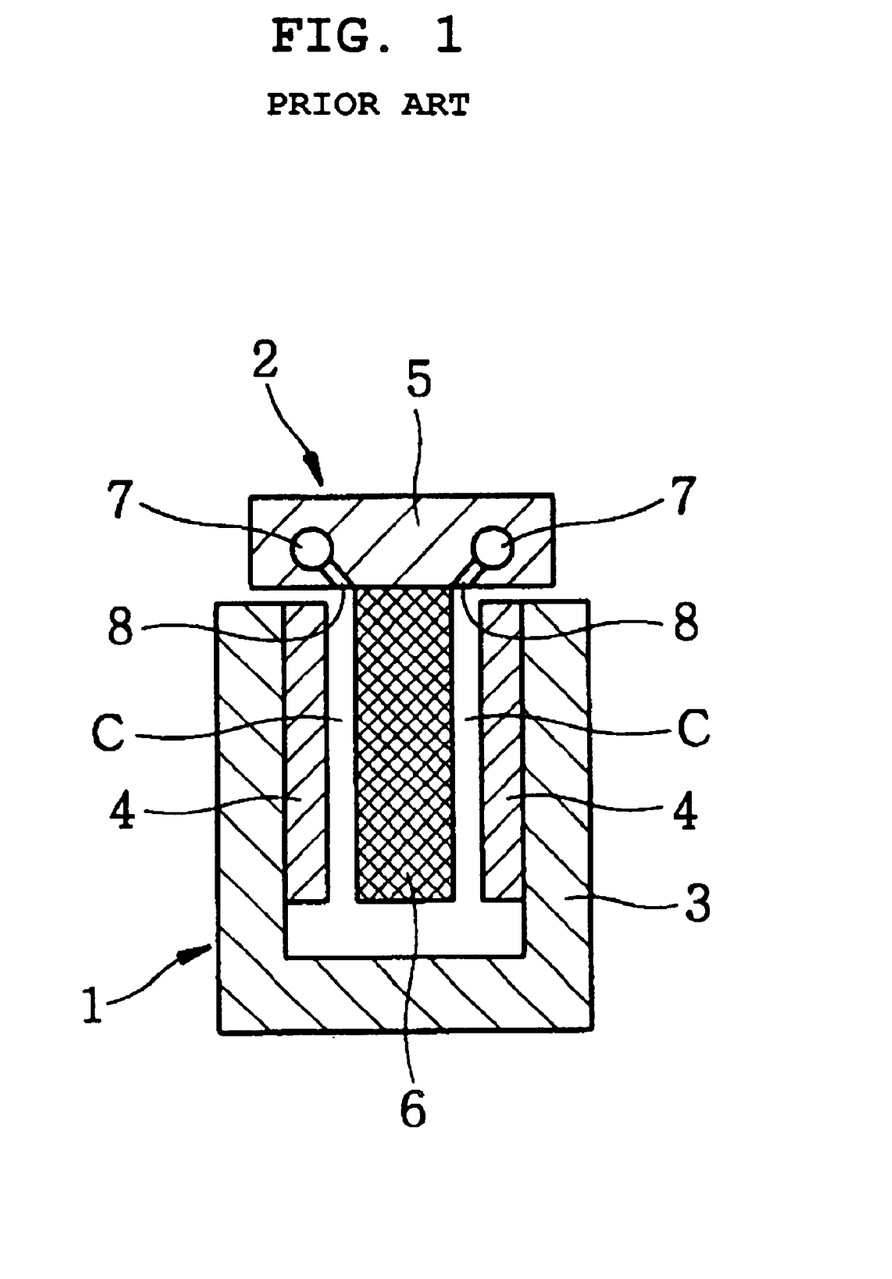
FIG. 1 is a constructional view illustrating a both-sided type linear motor using a conventional cooling apparatus.

Referring to FIG. 1, the both-sided type linear motor includes a stator 1 and a movable unit 2.

The stator 1 is composed of a 'U' shaped stator back iron 3, and a plurality of permanent magnets 4 sequentially aligned on the facing surfaces of the stator back iron 3 in which N and S polarities are alternately generated.

The movable unit 2 includes a movable unit back iron 5 positioned at an upper opening unit side of the stator back iron 3, and a coil unit 6 installed between the permanent magnets 4 at the lower portion of the movable unit back iron 5 with a constant gap (C).

In a state where the stator 1 and the movable unit 2 are separated by the gap (C), as a predetermined distance, when current is applied to the coil unit 6, thrust is generated between the permanent magnets 4 due to the Fleming's left-hand law, and thus the movable unit 2 performs the direct linear motion due to the thrust.

The operation of the linear motor will now be described. When a control device (not shown) applies current to the coil unit 6, the current is transferred to a coil of the coil unit 6, and magnetic field and thrust are generated between the permanent magnets 4 and the coil unit 6 installed inside the stator back iron 3, thereby moving the movable unit 2 in the front/rear direction. Here, the control device (not shown) controls a movement speed of the movable unit 2 and thrust by the movement according to a winding number of the coil and the supply current.

Since the movable unit 2 repeatedly moves at one side of the stator 1, relatively high heat is generated between the coil unit 6 and the permanent magnets 4 due to the current flowing through the coil. The heat changes magnetic field properties of the stator 1 and the movable unit 2. As a result, properties of the linear motor are varied not to enable precise controlling.

A cooling apparatus for the linear motor has been suggested to solve the foregoing problem.

As one example of the cooling apparatus for the linear motor, as shown in FIG. 1, at least one air hole 7 is formed in the movable unit back iron 5 in a longitudinal direction, and a plurality of air nozzles 8 are formed in the air hole 7 at predetermined intervals, and opened toward the stator 1, for injecting cooling air flowing along the air hole 7 into the gap (C) of the permanent magnets 4 and the coil unit 6.

When a temperature of the linear motor exceeds a predetermined value, the control device operates an air pump to supply the cooling air to the air hole 7. The air is supplied to the gap (C) between the permanent magnets 4 and the coil unit 6 through the air nozzle 8 to cool the permanent magnets 4 and the coil unit 6, thereby maintaining the linear motor at an appropriate temperature.

The conventional cooling apparatus for the linear motor supplies the cooling air to the gap (C) between the permanent magnets 4 and the coil unit 6, to cool the permanent magnets 4 and the coil unit 6. However, the cooling air is supplied merely from the upper air nozzles 8, the gap (C) receiving the cooling air is small, and thus the cooling air does not reach into the lower end portion of the gap (C). Accordingly, the linear motor does not have a uniform temperature in the whole portions, which results in misoperation of the linear motor and low reliability of the cooling apparatus for the linear motor.

SUMMARY OF THE INVENTION

Accordingly, it is an object of the present invention to provide a cooling apparatus for a linear motor which can uniformly cool the whole portions of the linear motor.

In order to achieve the above-described object of the invention, there is provided a cooling apparatus for a linear motor comprising:

a 'U' shaped stator back iron;

a stator having a plurality of permanent magnets installed on inner facing surfaces of the stator back iron;

a coil unit positioned between the stator and the permanent magnets with a predetermined gap;

a movable unit having a movable unit back iron fixed on the coil unit, the movable back iron having at least one first air hole formed therein in a longitudinal direction and a first air nozzle linked to the first air hole for injecting cooling air from the top portion of the coil unit to the bottom portion; and a frame aligned at the lower portion of the coil unit having a second air hole formed in a longitudinal direction thereof for receiving the cooling air and a second air nozzle linked to the second air hole for injecting the cooling air from the bottom portion of the coil unit to the top portion.

Preferably, the frame has a 'U' shape, both side vertical units of which being connected respectively to the front and rear portions of the movable unit back iron, thereby injecting cooling air from both sides of the second air hole and the first air hole.

Preferably, the second air hole is formed at one center portion of the frame, and the second air nozzle is protruded from both sides of the second air hole, for injecting the cooling air into both sides of the coil unit.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A cooling apparatus for a linear motor in accordance with a preferred embodiment of the present invention will now be described in detail with reference to the accompanying drawings.

Figure 2:
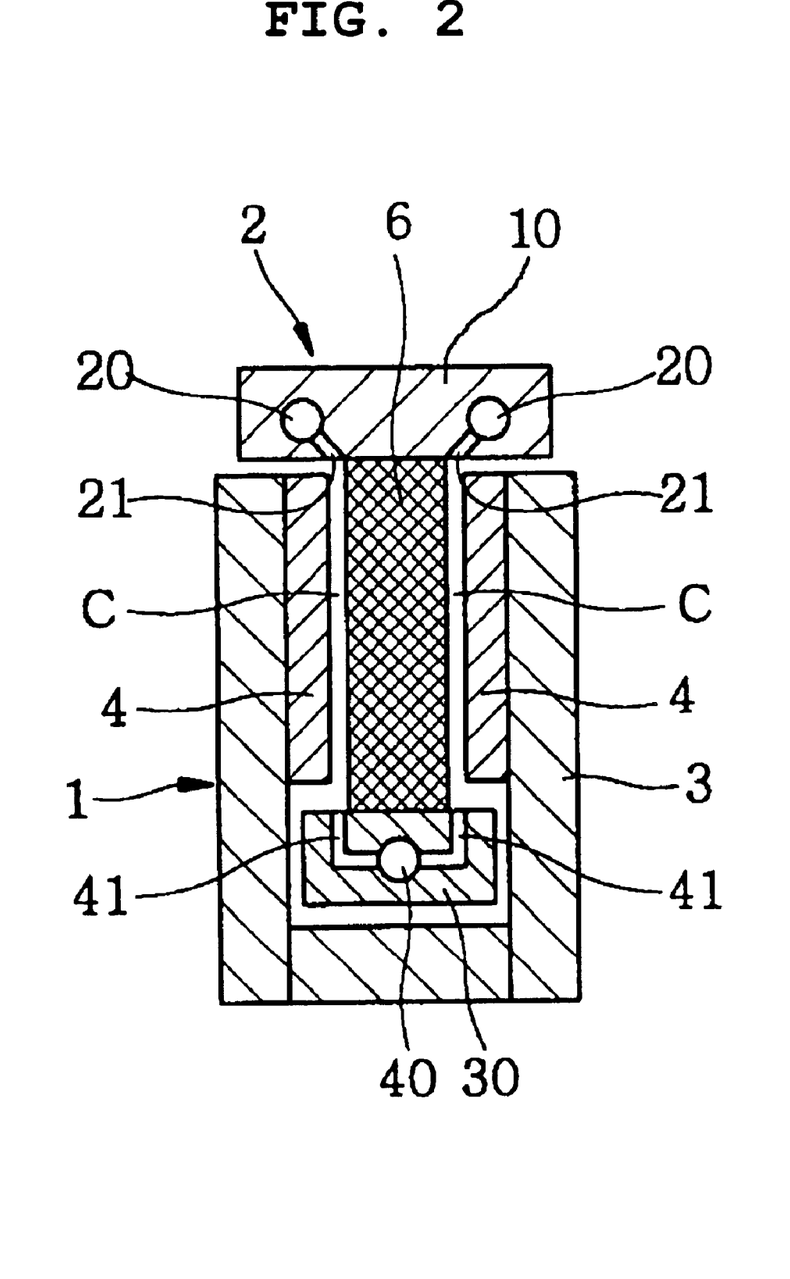
FIG. 2 is a front view illustrating a linear motor using a cooling apparatus for a both-sided type linear motor in accordance with the present invention.
Figure 3:
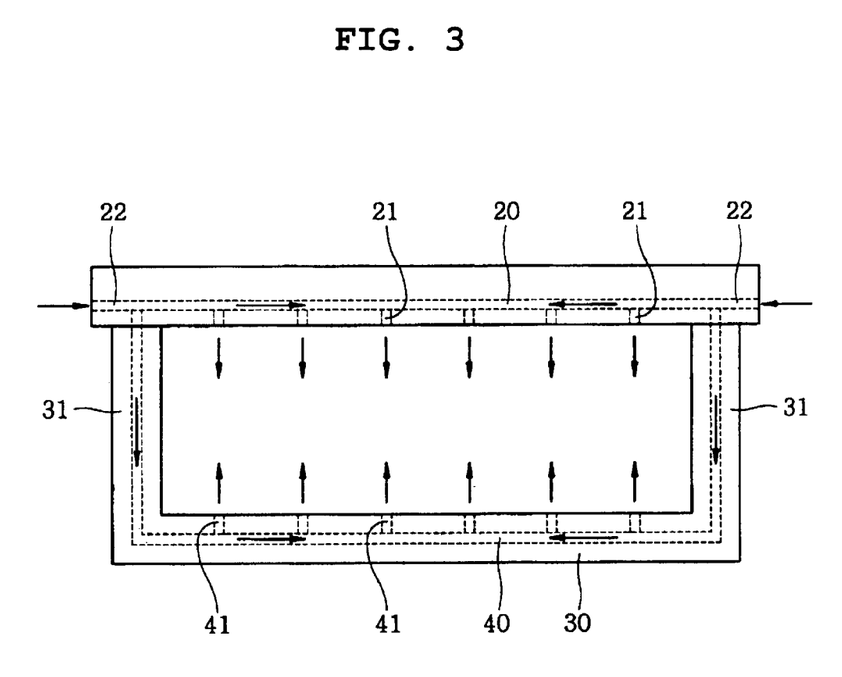
FIG. 3 is a side view illustrating a movable unit of the cooling apparatus for the both-sided type linear motor in accordance with the present invention.

FIG. 2 is a front view illustrating the linear motor using the cooling apparatus in accordance with the present invention, and FIG. 3 is a side view illustrating a movable unit of the cooling apparatus for the linear motor in accordance with the present invention.

Referring to FIG. 2, the cooling apparatus for the linear motor includes: at least one first air hole 20 formed in a longitudinal direction in a movable unit back iron 10 installed at the upper portion of a coil unit 6 of the linear motor, a first air nozzle 21 linked to the first air hole 20 with a predetermined interval, and opened toward the bottom portion (gap (C) side between the coil unit 6 and permanent magnets 4 of a stator), for injecting cooling air to the bottom portion; a frame 30 aligned at the lower portion of the coil unit 6; a second air hole 40 formed in the frame 30 in a longitudinal direction; a second air nozzle 41 linked to the second air hole 40 with a predetermined interval, and opened toward the top portion (gap (C) side between the coil unit 6 and permanent magnets 4), for injecting the cooling air to the top portion; a pump (not shown) for supplying the cooling air to the first and second air holes 20 and 40; and a valve (not shown) for controlling supply of the cooling air to maintain the linear motor in a predetermined temperature.

The first and second air nozzles 21 and 41 are aligned at the upper and lower portions of the coil unit 6, for receiving the cooling air from different passages. In addition, as depicted in FIG. 3, the frame 30 has approximately a 'U' shape, the second air hole 40 is branched from the first air hole 20 along both-sided vertical units 31 of the frame 30, and thus the first and second air nozzles 21 and 41 receives the cooling air from the identical supply source.

A plurality of first air holes 20 can be formed in the movable unit back iron 10 side by side. Preferably, the plurality of first air holes 20 can be formed in two portions of the movable unit back iron 10. The first air nozzle 21 of the first air hole 20 can be inclined toward the gap (C) at a predetermined angle.

The second air hole 40 can be formed at one center portion of the frame 30. When one second air hole 40 is formed, the second air nozzles 41 are protruded from both sides of the second air hole 40 to face the both sides of the coil unit 6, for supplying the cooling air to both sides of the coil unit 6.

The cooling air is supplied through incoming units 22 of both sides of the first air hole 20. The incoming units 22 can be connected respectively to the pumps or to one pump.

The operation of the cooling apparatus for the linear motor in accordance with the present invention will now be described.

When current is applied to the coil unit 6 to operate the linear motor, thrust is generated between the coil unit 6 and the permanent magnets 4, thereby moving the movable unit 2.

Here, high temperature heat is generated in the coil unit 6. When the temperature exceeds a predetermined value, the cooling apparatus starts to be operated.

A control device operates the pump, and the thusly-generated pumping force supplies the cooling air to the incoming units 22 of both sides of the first air hole 20 along an air circulation tube (not shown).

Part of the cooling air supplied to the incoming units 22 flows through the first air hole 20, and the rest cooling air is supplied to the second air hole 40 branched from the first air hole 20. The cooling air supplied to the respective air holes 20 and 40 is injected to the gap (C) between the coil unit 6 and the permanent magnets 4 through the first and second air nozzles 21 and 41.

The cooling air injected from the first air nozzle 21 flows from the top portion of the gap (C) to the center portion, and the cooling air injected from the second air nozzle 41 flows from the bottom portion of the gap (C) to the center portion, thereby cooling the whole portions of the coil unit 5 and the permanent magnets 4.

When the coil unit 6, the permanent magnets 4 and the gap (C) maintain a normal temperature, the control unit enables the valve to close the air circulation tube, thereby stopping driving of the pump.

Figure 4A:
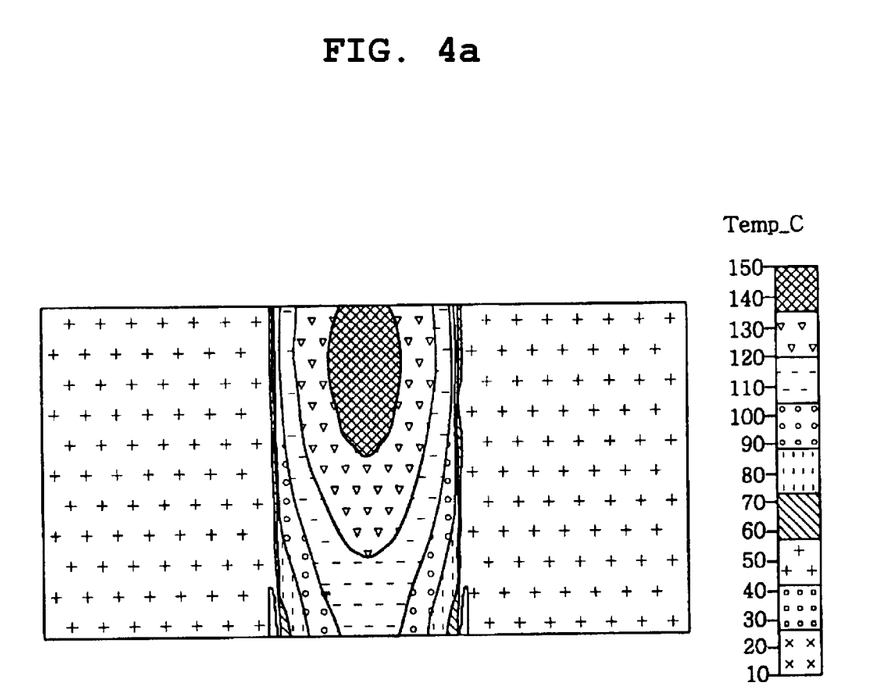
FIGS. 4a to 4c are views illustrating temperature distribution of the conventional cooling apparatus for the both-sided type linear motor and the cooling apparatus for the both-sided type linear motor of the present invention.
Figure 4B:
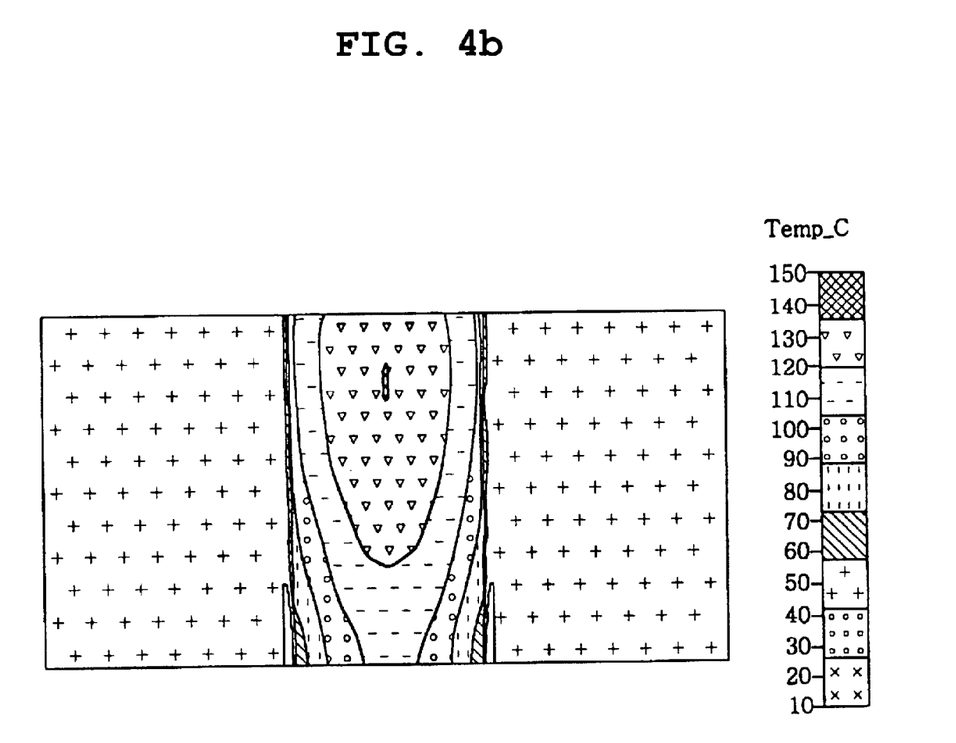
Figure 4C:
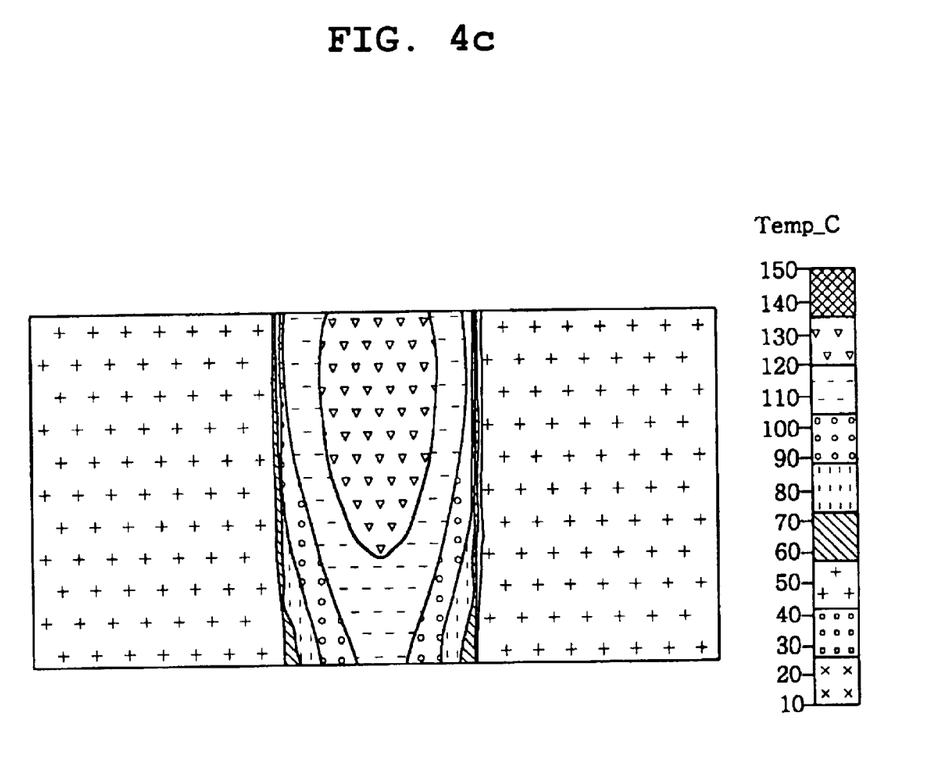

A temperature of the linear motor using the cooling apparatus in accordance with the present invention will now be compared with a temperature of the conventional linear motor with reference to FIGS. 4a to 4c.

FIGS. 4a to 4c illustrate temperature distribution of the movable unit when the cooling air is not supplied, when the cooling air is supplied merely from the top portion of the movable unit, and when the cooling air is supplied from the up/down right/left sides of the movable unit as in the present invention. As shown therein, B type where the cooling air is supplied merely from the top portion of the movable unit has a lower temperature than A type where the cooling air is not supplied, and C type where the cooling air is supplied from the up/down right/left sides has a lower temperature than B type.

Figure 5:
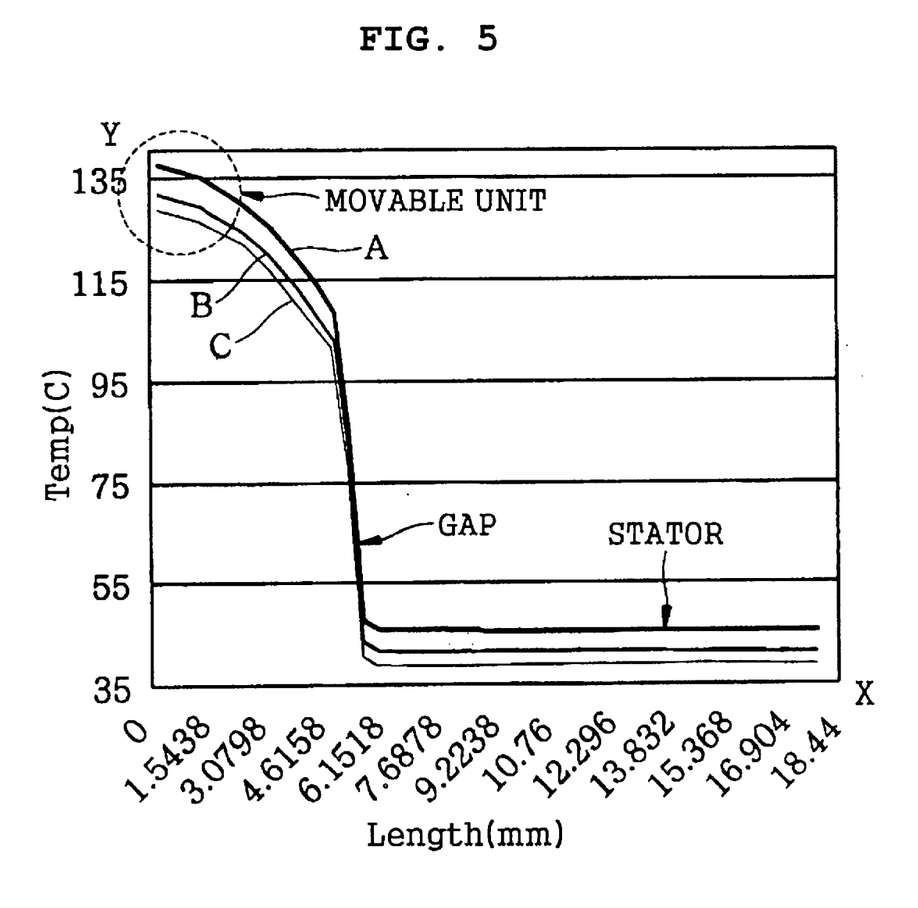
FIG. 5 is a graph illustrating temperature distribution of the conventional cooling apparatus for the linear motor and the cooling apparatus for the linear motor of the present invention.

FIG. 5 is a graph for comparing a temperature of the respective units (movable unit, gap and stator) of A, B and C types. Referring to FIG. 5, a temperature of the movable unit core is increased to 137° C. in A type. Here, B type shows temperature distribution lower than A type by about 5.5° C., and C type shows temperature distribution lower than B type by about 3° C.

In addition, a surface temperature of the stator is 45° C. in A type. Here, B type has a surface temperature lower than A type by 4° C., namely 41° C., and C type has a surface temperature lower than B type by 3° C.

Figure 6:
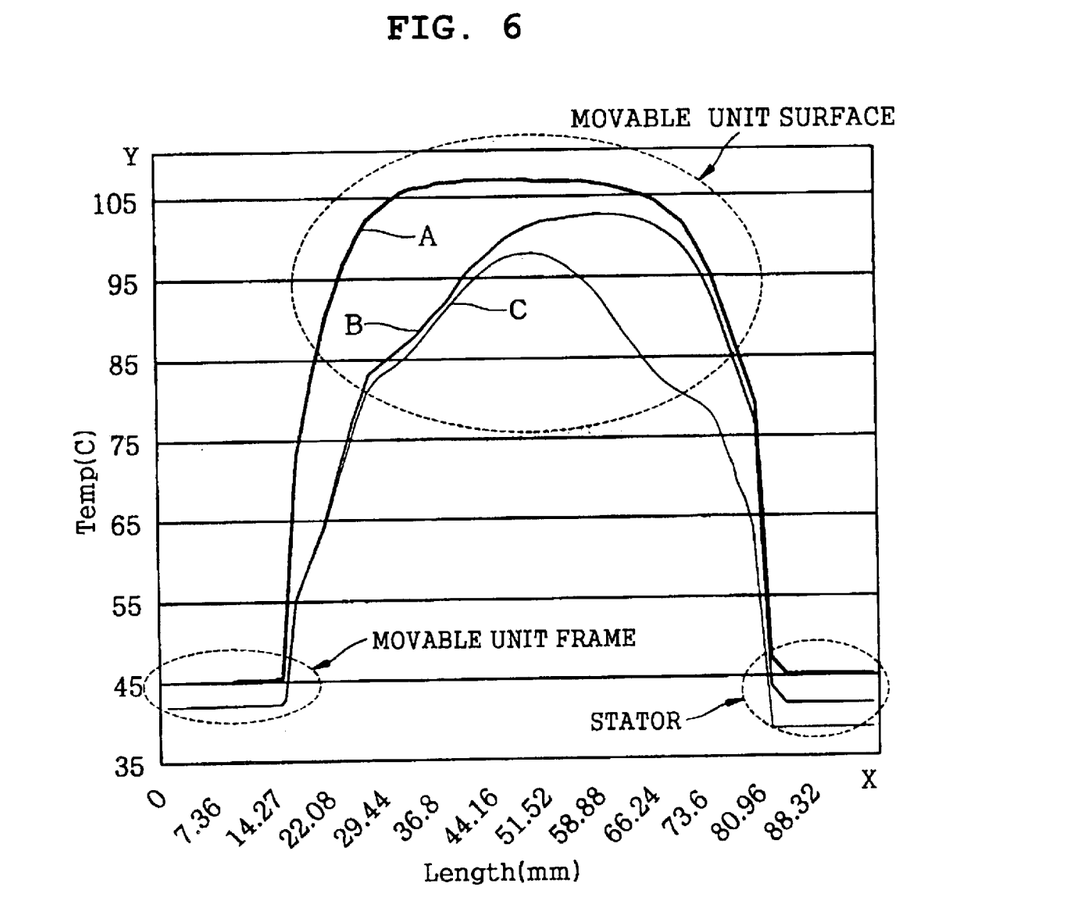
FIG. 6 is a graph illustrating temperature distribution of the conventional cooling apparatus for the linear motor and the cooling apparatus for the linear motor of the present invention.

FIG. 6 is a graph for comparing a surface temperature of the movable unit and a temperature of the movable unit and the stator. A type shows temperature distribution of about 106.6° C. (max) in a wide area, but B type shows temperature distribution of about 102.4° C. (max) lower than A type by about 4.2° C. at the lower portion, and C type shows temperature distribution of about 97.8° C. (max) lower than B type by about 4.6° C. at the center portion.

Accordingly, the cooling air is supplied from the upper and lower portions of the coil unit 6, and transferred toward the center portion, to uniformly cool the whole portions of the coil unit 6 and the permanent magnets 4, even if the gap (C) is small.

Figure 7A:
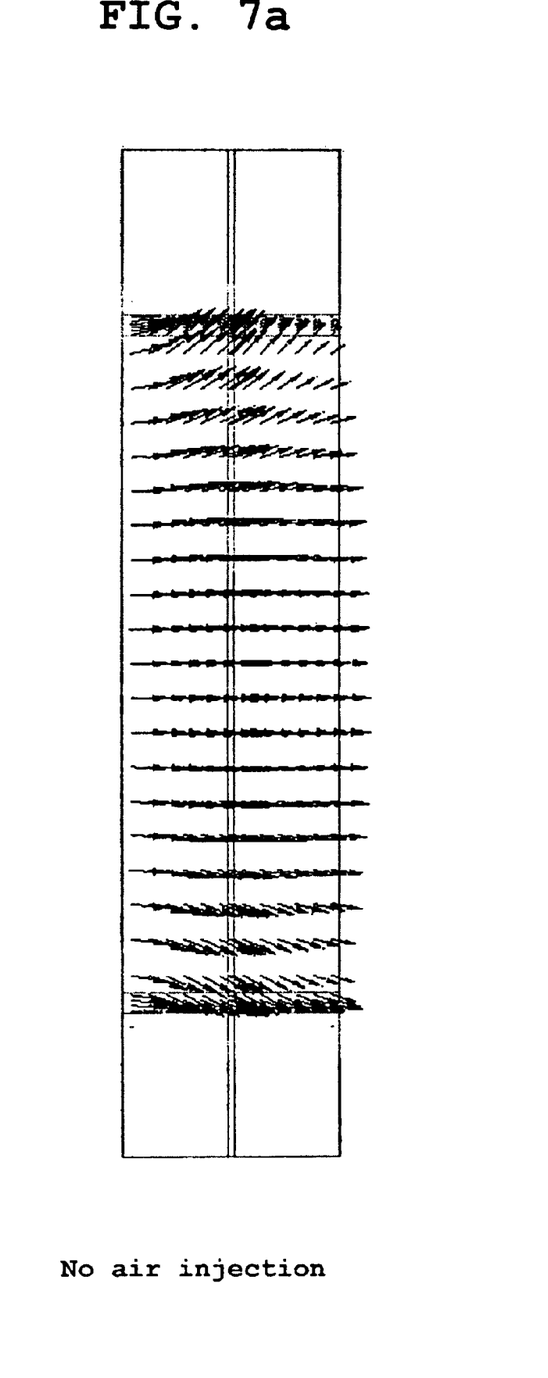
FIGS. 7a to 7c are view illustrating flow of cooling air in view of temperature in the cooling apparatus for the linear motor in accordance with the present invention.
Figure 7B:
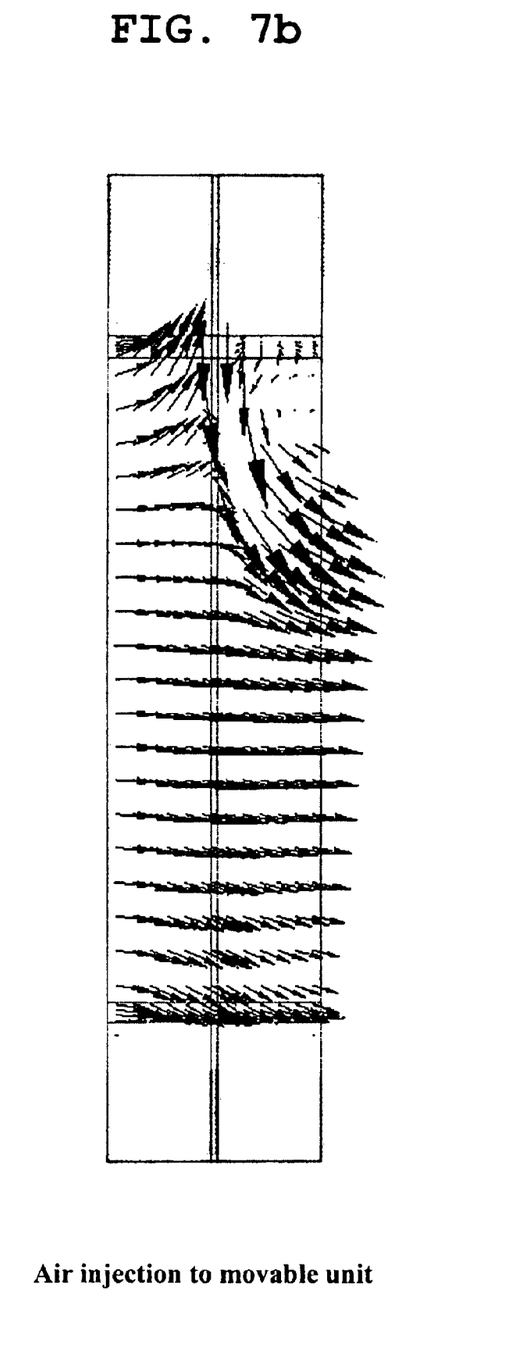
Figure 7C:
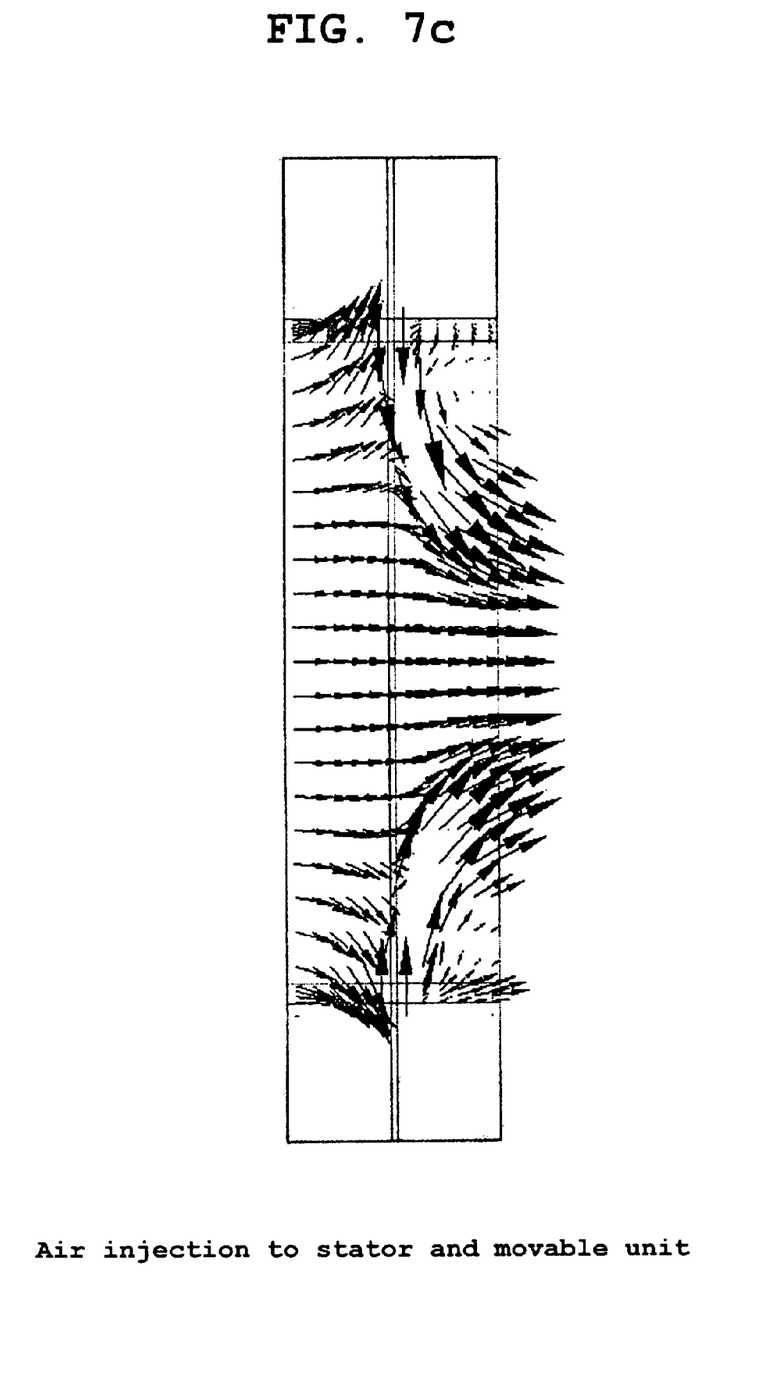

FIG. 7a shows the flow of cooling air between the stator 1 and movable unit 2. In the FIG. 7a, the air is not provided between the stator 1 and movable unit 2. In the FIG. 7b, the air is provided to the movable unit 2. Thus, the flow of cooling air shows only the side of the movable unit 2. However, FIG. 7c shows the flow of cooling air providing cooling air both stator 1 and movable unit 2. In the FIG. 7c, the cooling air is provided with the stator 1 and the movable unit 2. So that the temperature of the linear motor is not increased in spite of continuous operating of the linear motor.

As discussed earlier, in accordance with the present invention, the cooling air is supplied from the upper and lower portions of the movable unit at the same time, to uniformly cool the whole portions of the movable unit and the stator. As a result, reliability and durability of the linear motor and reliability of the cooling apparatus for the linear motor can be improved.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A cooling apparatus for a linear motor comprising:
   a 'U' shaped stator back iron;
   a stator having a plurality of permanent magnets installed on inner facing surfaces of the stator back iron;
   a coil unit positioned between the stator and the permanent magnets with a predetermined gap;
   a movable unit having a movable unit back iron fixed on the coil unit, the movable back iron having at least one first air hole formed therein in a longitudinal direction and a first air nozzle linked to the first air hole for injecting cooling air from the top portion of the coil unit to the bottom portion; and
   a frame aligned at the lower portion of the coil unit having a second air hole formed in a longitudinal direction thereof for receiving the cooling air and a second air nozzle linked to the second air hole for injecting the cooling air from the bottom portion of the coil unit to the top portion.

2. The cooling apparatus according to claim 1, wherein the frame has a 'U' shape, comprising side vertical units, wherein both side vertical units are connected respectively to front and rear portions of the movable unit back iron, thereby injecting cooling air from both sides of the second air hole and the first air hole.

3. The cooling apparatus according to claim 1, wherein the second air hole is formed at a center portion of the frame, and the second air nozzle is protruded from both sides of the second air hole, for injecting the cooling air into both sides of the coil unit.

4. A cooling apparatus for a linear motor, comprising:
   a movable unit;
   an upper air duct disposed in a top of the movable unit and extending along a length of the movable unit;
   first and second upper air nozzles disposed in the top of the movable unit, each in pneumatic communication with the upper air duct;
   a lower air duct disposed in a bottom of the movable unit and extending along the length of the movable unit; and
   first and second lower air nozzles disposed in the bottom of the movable unit, each in pneumatic communication with the lower air duct.

5. The cooling apparatus for a liner motor of claim 4, wherein the upper air duct comprises a first and a second upper air duct, wherein the first upper air duct is in pneumatic communication with the first upper nozzle and the second upper air duct is in pneumatic communication with the second upper nozzle.

6. The cooling apparatus for a linear motor of claim 4, wherein the first and second upper air nozzles and the first and second lower air nozzles are configured to blow air across respective first and second side surfaces of the movable unit.

7. The cooling apparatus for a linear motor of claim 4, wherein the first and second upper air nozzles are inclined towards side surfaces of the movable unit.

8. The cooling apparatus for a linear motor of claim 4, wherein the first and second lower air nozzles are configured to direct air parallel to side surfaces of the movable unit.

9. The cooling apparatus for a linear motor of claim 4, wherein the movable unit comprises a coil unit, wherein the first and second upper air nozzles are configured to direct air towards a top of the coil unit and the first and second lower air nozzles are configured to direct air towards a bottom of the coil unit.

10. The cooling apparatus for a linear motor of claim 4, wherein the first upper air nozzle comprises multiple air nozzles and the second upper air nozzle comprises multiple air nozzles.

11. The cooling apparatus for a linear motor of claim 10, wherein the first lower air nozzle comprises multiple air nozzles and the second lower air nozzle comprises multiple air nozzles.

12. The cooling apparatus for a linear motor of claim 11, wherein the first and second upper air nozzles are aligned with corresponding first and second lower air nozzles, respectively.

13. A method of cooling a linear motor, comprising:
   directing air from first and second upper air nozzles formed on a movable unit onto first and second surfaces of a coil unit that is also formed on the movable unit, respectively; and
   directing air from first and second lower air nozzles formed on the movable unit onto the first and second surfaces of the coil unit, respectively.

14. The method of claim 13, further comprising supplying air to the first upper air nozzle with a first upper air duct, supplying air to the second upper air nozzle with a second upper air duct, and supplying air to the first and second lower air nozzles with a lower air duct.

15. The method of claim 13, further comprising directing air from the first and second upper air nozzles at a inclined angle relative to the first and second surfaces of the coil unit, respectively.

16. The method of claim 13, further comprising directing air from the first and second lower air nozzles parallel to the first and second surfaces of the coil unit, respectively.

17. The method of claim 13, further comprising directing air from the first and second upper air nozzles towards a top of the coil unit.

18. The method of claim 13, further comprising directing air from the first and second lower air nozzles towards a bottom of the coil unit.

19. The method of claim 13, wherein the step of directing air from first and second upper air nozzles comprises directing air from a plurality of first and second upper air nozzles, respectively, and wherein the step of directing air from first and second lower air nozzles comprises directing air from a plurality of first and second lower air nozzles, respectively.

20. The method of claim 13, further comprising aligning each of the first and second upper air nozzles with corresponding first and second lower air nozzles.

21. A cooling apparatus for a linear motor, comprising:
   means for directing air from first and second air nozzles formed on a movable unit onto first and second surfaces of a coil unit also formed on the movable unit, respectively; and
   means for directing air from first and second lower air nozzles formed on the movable unit onto the first and second surfaces of the coil unit, respectively.

* * * * *